(No Model.) 2 Sheets—Sheet 1.
C. W. HAMSHAW.
VELOCIPEDE.
No. 348,325. Patented Aug. 31, 1886.
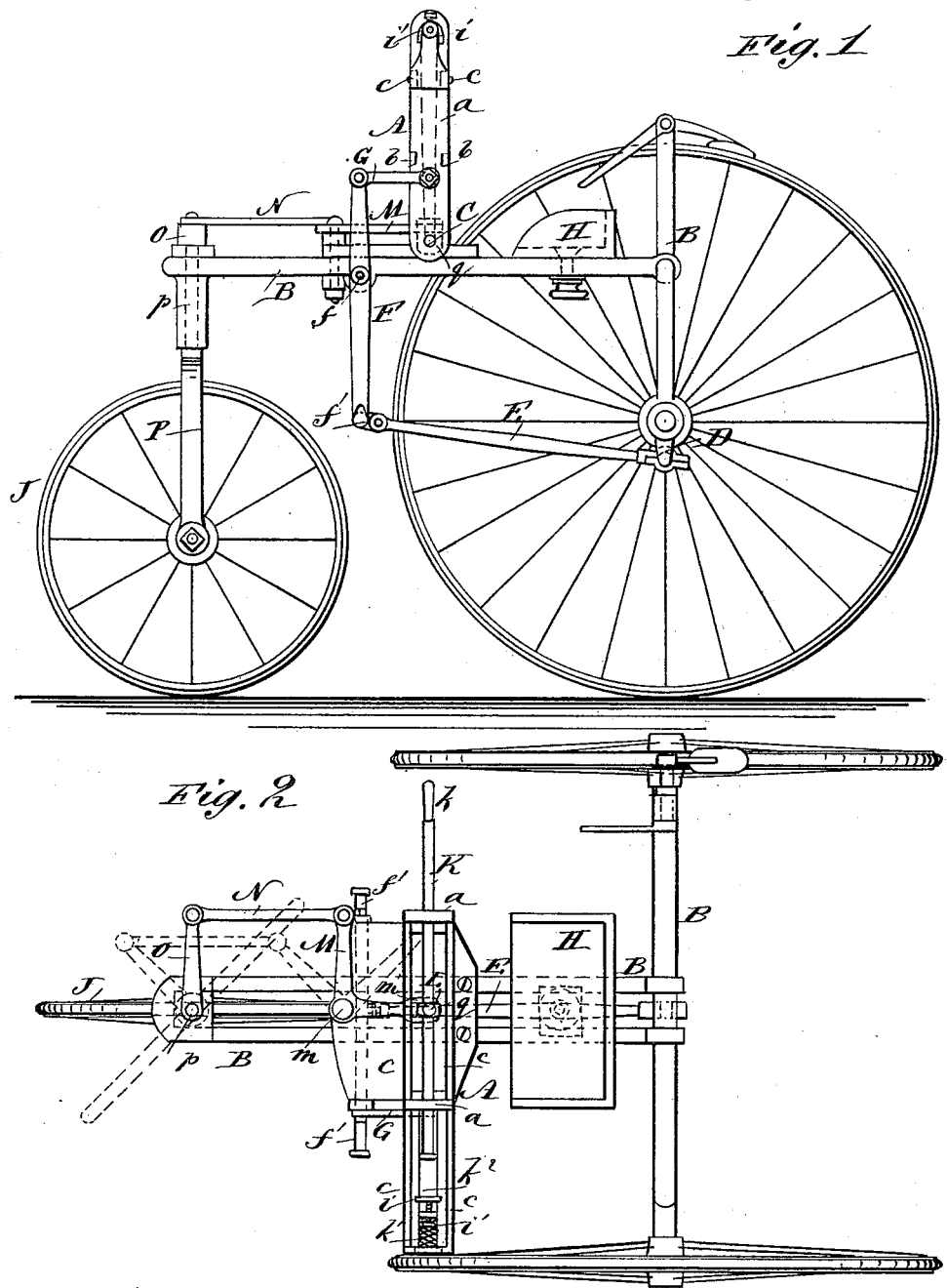
WITNESSES:
C. Neveux
C. Sedgwick
INVENTOR:
C. W. Hamshaw
BY Munn & Co.
ATTORNEYS.

(No Model.) 2 Sheets—Sheet 2.

G. W. HAMSHAW.
VELOCIPEDE.

No. 348,325. Patented Aug. 31, 1886.

WITNESSES:
C. Neveux
C. Sedgwick

INVENTOR:
G. W. Hamshaw
BY Munn & Co
ATTORNEYS.

UNITED STATES PATENT OFFICE.

CHARLES W. HAMSHAW, OF BLUE SPRINGS, MISSOURI.

VELOCIPEDE.

SPECIFICATION forming part of Letters Patent No. 348,325, dated August 31, 1886.

Application filed April 22, 1886. Serial No. 199,863. (No model.)

*To all whom it may concern:*

Be it known that I, CHARLES W. HAMSHAW, of Blue Springs, in the county of Jackson and State of Missouri, have invented a new and Improved Propelling and Steering Power, of which the following is a full, clear, and exact description.

My invention is applicable to tricycles and other hand or foot power vehicles, and to small boats in which propelling-wheels are substituted for oars; and my invention consists, principally, in combining with the hand-propelling mechanism means whereby the steering device (wheel or rudder) may be controlled without the rider releasing his grasp upon the handles of the propelling mechanism.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 4:
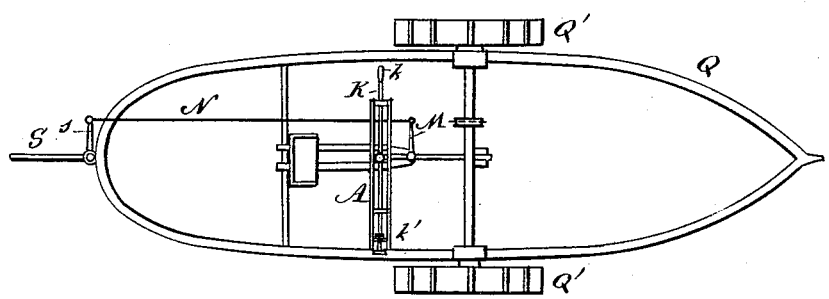
Figure 5:
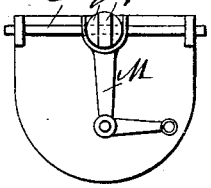

Figure 1 is a side elevation of a tricycle having my invention applied thereto. Fig. 2 is a plan view, and Fig. 3 a front elevation, of the same. Fig. 4 shows my invention applied to a boat. Fig. 5 is a detailed view showing the connection between the bell-crank and the vertical rod L.

Figure 3:
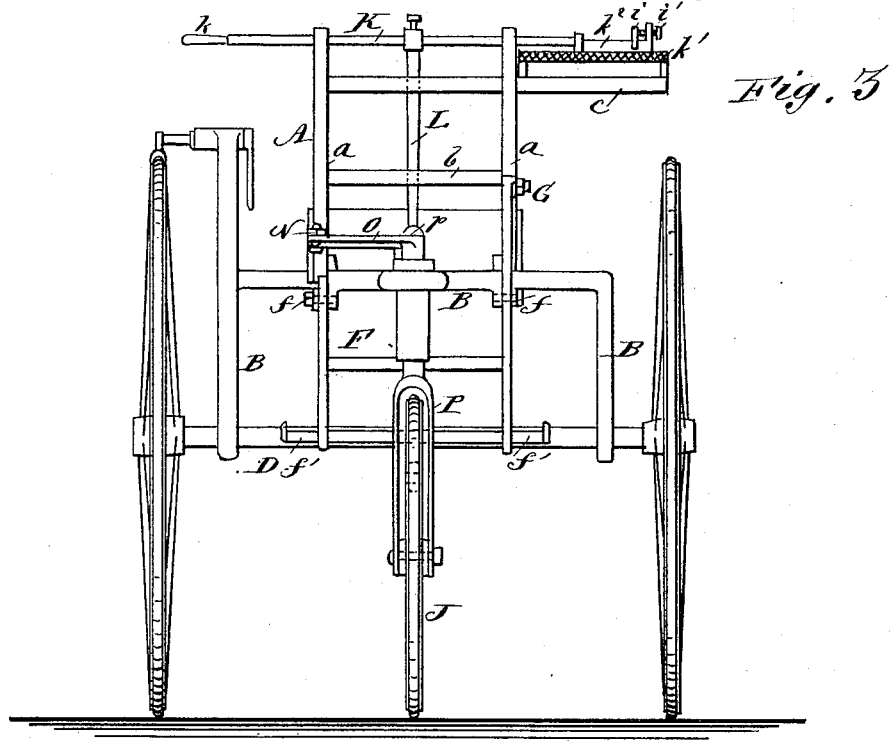

Referring to Figs. 1, 2, and 3 of the drawings, A represents the hand-power lever or frame, composed mainly of the two uprights $a\, a$, central braces, $b\, b$, and upper braces, $c\, c$, which latter project to one side of the frame A, as shown clearly in Figs. 2 and 3. The side pieces, $a\, a$, are pivoted to the main frame B of the vehicle upon the rod C, and connected to the crank shaft or axle D, in this instance, by the lower pitman-rod, E, intermediate lever or foot-frame, F, and upper connecting rod or link, G, so the reciprocation of the frame A will revolve the axle and propel the vehicle. The foot-frame F is fulcrumed at $f$, and provided at each side with the foot-pieces $f'$, so a person sitting on the seat H may use both his feet and hands in propelling the vehicle. The front wheel, J, may be turned for guiding the vehicle by sliding endwise the rod K, which is held loosely at the upper ends of the side pieces, $a\, a$, of the frame A, and which constitutes one of the hand-grasps of the said frame A, the end $k$ being shaped into a handle for that purpose. The other hand-grasp, $k'$, of the frame A is somewhat elongated, and in this instance is secured upon that portion of the upper braces, $c$, which projects to one side of the frame A. The end of the rod K, above the grasp $k'$, is formed or provided with a hand-piece, $k^2$, which is to be grasped by the rider together with the hand-piece $k'$, so there will be no difficulty in holding the rod K firmly for controlling the front wheel, J. The rod K is connected with the wheel J by the rod L, bell-crank lever M, connecting-rod N, and crank-arm O, secured to the vertical pivot $p$ of the fork P, in which the front wheel, J, is journaled. The bell-crank lever M is pivoted at $m$ to the main frame B, and is forked at $m'$ to engage with the lower end of the rod L, so that when the rod L is moved by moving the bar K longitudinally the bell-crank will be turned accordingly and will turn the wheel J in either direction, so by simply sliding the rod K the tricycle may be guided without the rider releasing his grasp upon the frame A. Attached to the hand-piece $k'$ is the sliding plate $i$, adapted to be adjusted along the hand-piece by the screw $i'$, to adapt the hand-piece to the hand of the rider, so the hand will not slip in moving the bar K for guiding the vehicle.

In Fig. 4 I have shown my invention applied to a boat, Q, with side paddle-wheels, $Q'\, Q'$. The frame A, longitudinally-sliding rod K, bell-crank M, and connecting-rod N are the same as in the other figure, except the rod N is connected with the arm $s$ of the rudder S. By sliding the rod K the rudder may be turned to the right or left for guiding the boat.

Upon the rod C is placed a sliding block, $q$, (shown clearly in Fig. 5,) with which the bell-crank M is connected by a fork, $m^3$, and the block is slotted at its upper end, as shown at $q'$, to receive the lower end of the rod L, so that there is a kind of universal connection between the bell-crank and the rod L, arranged so that the block slides easily upon the rod C when lateral pressure is put upon it through the rod L. In this manner the guide-wheel when turned to any angle can be held at such position without straining the hands of the rider.

Having thus fully described my invention, what I claim as new, and desire to secure by Letters Patent, is—

1. The combination, with the frame or lever A and the steering device, of the sliding bar K, constituting the handle of the frame or lever, and intermediate mechanism connecting the rod K with the steering device, whereby the movement of the bar K will turn the steering device, substantially as described.

2. The sliding rod or handle K, connected to the bell-crank lever M by the rod L, in combination with the arm O and the connecting-rod N, substantially as described.

3. The lever-frame A, having the side handle, k, in combination with the sliding rod K, arranged over the handle k', substantially as and for the purposes set forth.

4. The pivoted foot power or frame F, connected to the crank-axle, in combination with the hand-power frame or lever A, pivoted at C and connected with the upper end of the foot-frame F, substantially as and for the purposes set forth.

5. The sliding block q on rod C, in combination with the bell-crank M and rod L for sliding the block, substantially as described.

6. The pivoted foot-frame F, connected to the crank-axle by rod E, in combination with the hand-power frame A, connected to the frame F, and the sliding handle-bar K and intermediate mechanism connecting the bar K with the steering device, substantially as and for the purposes set forth.

7. The combination, with the hand-piece $k^2$, of the plate i and adjoining screw i', substantially as and for the purposes set forth.

CHARLES W. HAMSHAW.

Witnesses:
C. W. WEST,
H. G. GREEN.